(12) United States Patent
Croak et al.

(10) Patent No.: US 8,942,367 B1
(45) Date of Patent: Jan. 27, 2015

(54) METHOD AND APPARATUS FOR ROUTING A CALL IN A COMMUNICATIONS NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1818 days.

(21) Appl. No.: 11/263,273

(22) Filed: Oct. 31, 2005

(51) Int. Cl.
*H04M 3/42* (2006.01)
(52) U.S. Cl.
USPC .................................................. 379/211.02
(58) Field of Classification Search
CPC .. H04M 3/54; H04M 7/1275; H04M 2242/30
USPC ........... 379/211.02, 212.01, 221.01; 370/217, 370/218, 352
See application file for complete search history.

(56) References Cited

U.S. PATENT DOCUMENTS

| | | | |
|---|---|---|---|
| 6,373,817 B1* | 4/2002 | Kung et al. | 370/217 |
| 6,477,374 B1* | 11/2002 | Shaffer et al. | 379/211.02 |
| 6,751,307 B2* | 6/2004 | McAlinden | 379/201.02 |
| 6,895,558 B1* | 5/2005 | Loveland | 715/746 |
| 6,970,909 B2* | 11/2005 | Schulzrinne | 709/206 |
| 2002/0116336 A1* | 8/2002 | Diacakis et al. | 705/51 |
| 2004/0028208 A1* | 2/2004 | Carnazza et al. | 379/221.01 |
| 2004/0202301 A1* | 10/2004 | Elliott | 379/201.02 |
| 2004/0235520 A1* | 11/2004 | Cadiz et al. | 455/557 |
| 2005/0113077 A1* | 5/2005 | Bushnell et al. | 455/417 |
| 2007/0060137 A1* | 3/2007 | Yeatts et al. | 455/445 |

* cited by examiner

*Primary Examiner* — Nafiz E Hoque

(57) ABSTRACT

A method and apparatus for routing a call based on electronic calendar entries in a communications network is described. In one embodiment, a call request to establish a connection with a subscriber of network services is received. An electronic calendar associated with the subscriber is subsequently accessed. Afterwards, the call request is routed to a phone number associated to a present agenda activity detailed in the electronic calendar.

6 Claims, 4 Drawing Sheets

METHOD AND APPARATUS FOR ROUTING A CALL IN A COMMUNICATIONS NETWORK

BACKGROUND OF THE INVENTION

1. Field of the Invention

Embodiments of the present invention generally relate to telecommunications systems and, more particularly, to a method and apparatus for routing a call based on electronic calendar entries in a communications network, such as a packet network, e.g., a Voice over Internet protocol (VoIP) network.

2. Description of the Related Art

The Internet has emerged as a critical communication infrastructure, carrying traffic for a wide range of important scientific, business and consumer applications. Internet services are becoming ubiquitous and customers are combining both voice and data services on a single Internet based infrastructure such as a packet network e.g., a Voice over Internet Protocol (VoIP) network. VoIP service providers offer their customers an increasing array of enhanced services beyond the basic telephony service. These services are innovative and give the users more control over their telephony services. Notably, call services, such as "find me/follow me" services, are currently being utilized by network service subscribers as a means to receive calls despite frequently traveling from one location to another. However, these call services presently do not reference a subscriber's schedule as detailed in personal calendar entries for call routing purposes.

Thus, there is a need in the art for a method and apparatus that can route a call based on electronic calendar entries.

SUMMARY OF THE INVENTION

In one embodiment, a method and apparatus for routing a call based on electronic calendar entries in a communications network is described. Specifically, a call request to establish a connection with a subscriber of network services is received. An electronic calendar associated with the subscriber is subsequently accessed. Afterwards, the call request is routed to a phone number associated to a present agenda activity detailed in the electronic calendar.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
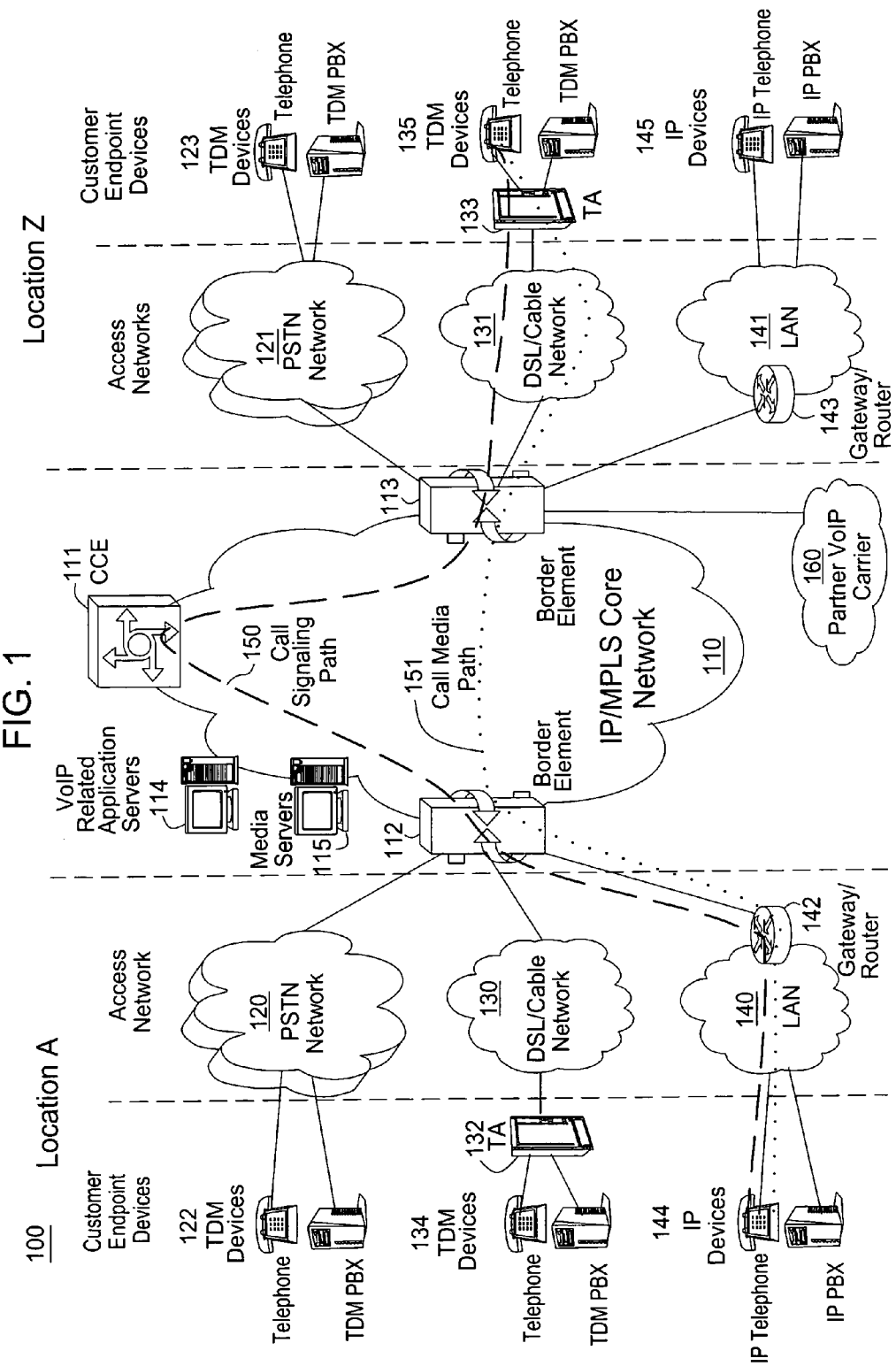
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

One embodiment of the present invention provides a call handling service that is integrated with calendar entries in an electronic calendar. It enables the network to determine the best location to route a call by using "find me/follow me" service logic situation by first trying to detect the location of user and their endpoint availability by inspecting their calendar entry at the time the call is received.

Figure 2:
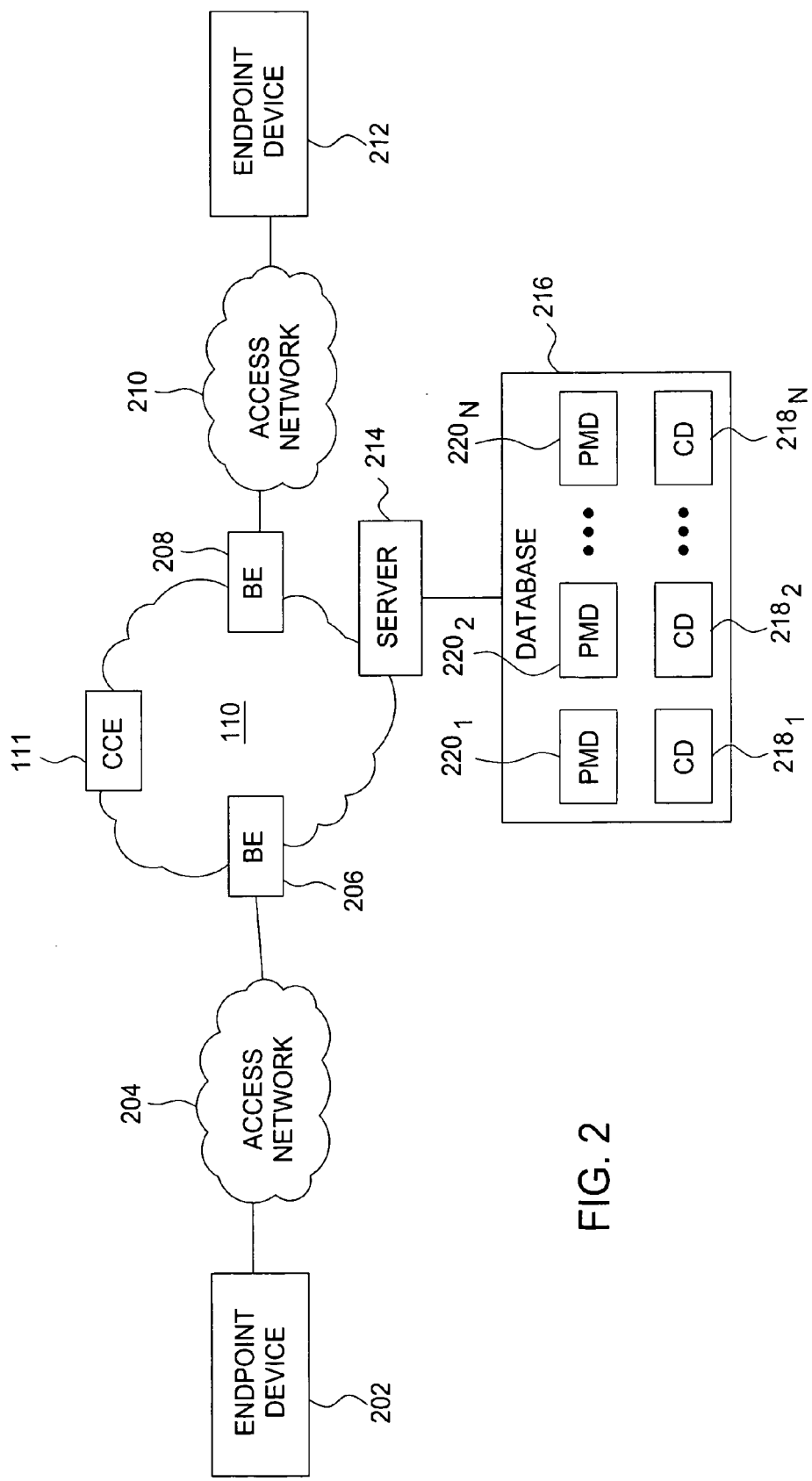
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and one or more border elements (BEs) 206. An endpoint device 212 is configured for communication with the core network 110 via an access network 210 and one or more BEs 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc.).

The core network 110 also includes a server 214 in communication with a database 216. In one embodiment of the present invention, the server 214 may support an electronic calendar application that may be used by a subscriber to schedule business appointments, personal agenda activities, and other calendar entries in a manner not unlike conventional software calendaring applications (e.g., a stand-alone calendar application). In addition, the server 214 may also be responsible for receiving call requests intended for recipients that are subscribers to certain call services, such as a "find me/follow me" call service. The server 214 is capable of obtaining certain routing information from a database and forwarding a call request to an appropriate number (based on a corresponding electronic calendar entry). Likewise, the server 214 may also be used to store data associated with subscribers, such as calendar entry data $218_{1...n}$ and phone mapping data $220_{1...n}$ into the database 216. The database 216 may be any type of electronic collection of data that is well known in the art.

In one embodiment of the present invention, the server 214 supports at least one web-based portal that may be used to access a variety of network call services, e.g., a "find me/follow me" service. A "find me/follow me" service is a call service that enables a user to designate a particular phone number (e.g., a "master" phone number) that may be used by others to reach the user in a more effective manner. In one embodiment, the find me/follow me service receives a plurality of phone numbers (e.g., office phone, home phone, cell phone, pager number, etc.) from the user via a web-based portal. The user may either designate the order the numbers should be called or alternatively, the user may establish a predefined schedule that corresponds a particular phone number with a particular time of day. For example, the user may utilize a web portal to "map" his office number with the particular phone number (e.g., a "master" phone number) between the hours from 8 A.M. to 5 P.M. Similarly, the user's cell phone and home phone may be designated between the hours of 5 P.M. to 6 P.M. and 7 P.M. to 9 P.M., respectively. In one embodiment, service logics for the "find me/follow me" service can be implemented on a dedicated application server within the communication network. Namely, in setting up a call, a CCE may consult with the "find me/follow me" application server prior to setting up the call. As an alternative to using these particular embodiments of the "find me/follow me" services, the web-based application server 214 may also be configured to receive an override command (from the user or server 214) that indicates that a calendar based "find me/follow me" service that is integrated with calendar entries in an electronic calendar is to be utilized first.

In one embodiment, a subscriber accesses an electronic calendar application via a web portal supported by server 214. This electronic calendar application, which is provided by the network provider, may function as a conventional software based calendar that allows a user to enter the date, time, and place for appointments, meetings, and other agenda activities as personalized calendar entries. The calendar entry data 218 is then saved into a database 216 by the server 214. In addition to the calendar entry data 218, the server 214 also utilizes the database 216 to store phone number mapping data 220. The phone number mapping data comprises the phone number designations that correspond to the calendar entries. Notably, each calendar entry may be associated with a predefined phone number designated by the user. This phone number association may be made at the time the calendar entry is made (e.g., a per calendar entry basis) or a list of frequently used calendar entries may be set up (wherein each entry is mapped to a particular number). This "phone number mapping" list would then serve as the default for subsequent calendar entry associations. For example, any calendar entry pertaining to the subscriber's temporary work office may be mapped to the subscriber's temporary office phone number.

Once the preliminary calendar entry designations are made by the subscriber user, the present invention will be ready for implementation. In one example, a caller using endpoint device 202 places a call request to establish a connection with the subscriber at endpoint device 212. Upon receiving the call request (via BE 206), the CCE 111 recognizes that the number the caller wishes to connect to is a "find me/follow me" phone number. Consequently, the CCE 111 forwards the call to the web-based application server 214 for further processing. After receiving the signaling message from the CCE 111, the server 214 recognizes the number as one that is associated with a subscriber account that has designated his calendar as the primary locating mechanism (via an override command), thus subordinating the service logic associated with other "find me/follow me" services. Specifically, the subscriber has configured the "find me/follow me" application to reference the electronic calendar prior to using the traditional find me/follow me service logic and therefore serve as the primary means of locating the subscriber (as opposed to calling a list of pre-ordered telephone numbers, for example). This affords a subscriber the convenience to note changes in his or her personal calendar without the need to update the "find me/follow me" service logic stored in the communications network. The server 214 then accesses the subscriber's calendar entry data (i.e., a personal calendar with entries) and locates the calendar entry that corresponds to the time and date the call request is being made (i.e., a "present" calendar entry). If a calendar entry that corresponds to the current time exists, the server 214 accesses the phone mapping data 220 in database 216 to determine the appropriate phone number in which the call request may be forwarded. The call connection is then processed in a conventional manner. In the event a calendar entry corresponding to the time the call request was made does not exist, then the server 214 may forward the call to a voice mailbox. Alternatively, the server may utilize the default "find me/follow me" service logic designated by the subscriber.

Figure 3:
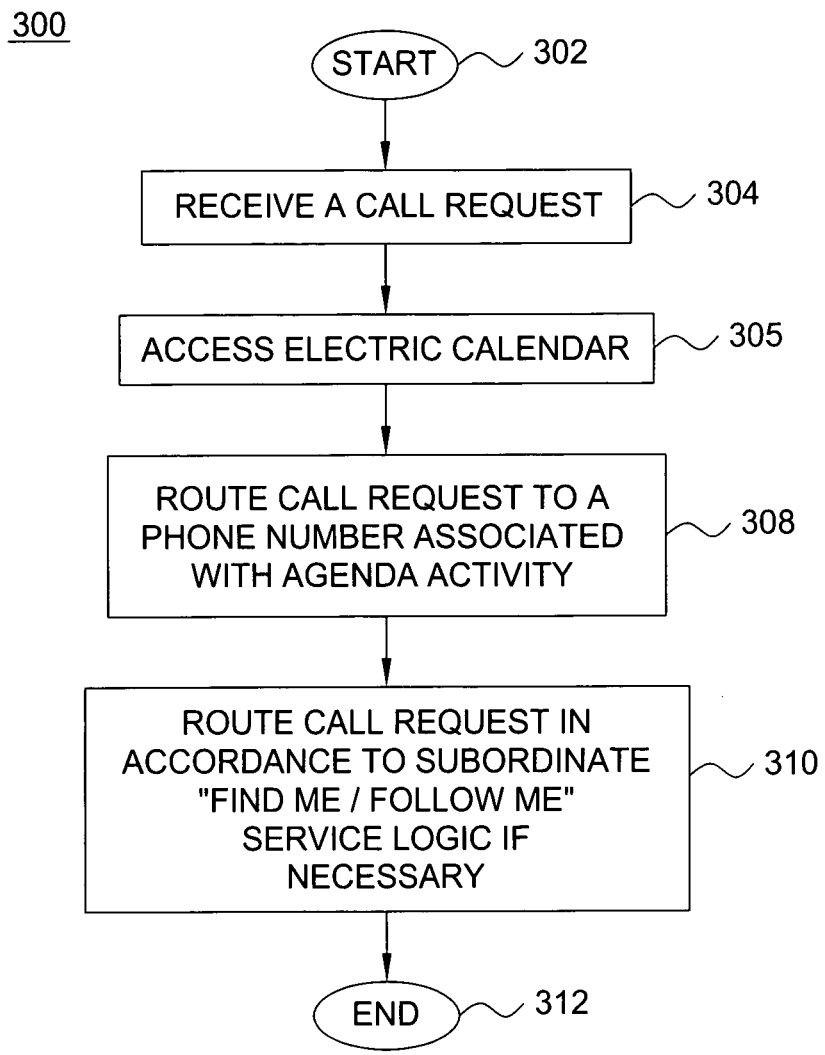
FIG. 3 is a flow diagram depicting an exemplary embodiment of a method for routing a call based on electronic calendar entries in a communications network in accordance with one or more aspects of the invention.

FIG. 3 is a flow diagram depicting an exemplary embodiment of a method 300 for routing a call based on electronic calendar entries in a communications network as related to one or more aspects of the invention. The method 300 begins at step 302 and proceeds to step 304 where a call request is received. In one embodiment, a server 214 receives (via a core VoIP network) a call setup message (e.g., from a CCE) intended for a subscriber of VoIP network call services.

At step 306, an electronic calendar is accessed. In one embodiment, the server 214 accesses a database 216 and reads the calendar entry data that is associated with the intended subscriber (e.g., the called party). At step 308, the call request is routed to a phone number associated with a present agenda activity. In one embodiment, the server 214 references the subscriber's "phone mapping data" 220 and forwards the call to the phone number that is mapped to the "present" agenda activity (i.e., the agenda activity that is listed at the time and date the call is made). At step 310, the call request is routed in accordance to a default "find me/follow me" service if the present calendar entry is not associated to any phone mapping data. In one embodiment, the server 214 routes the call request in accordance to the service logic of a subordinate "find me/follow me" service in the event the present calendar entry is not linked to any phone mapping data stored in the database 216. The method 300 continues to step 312 and ends.

Figure 4:
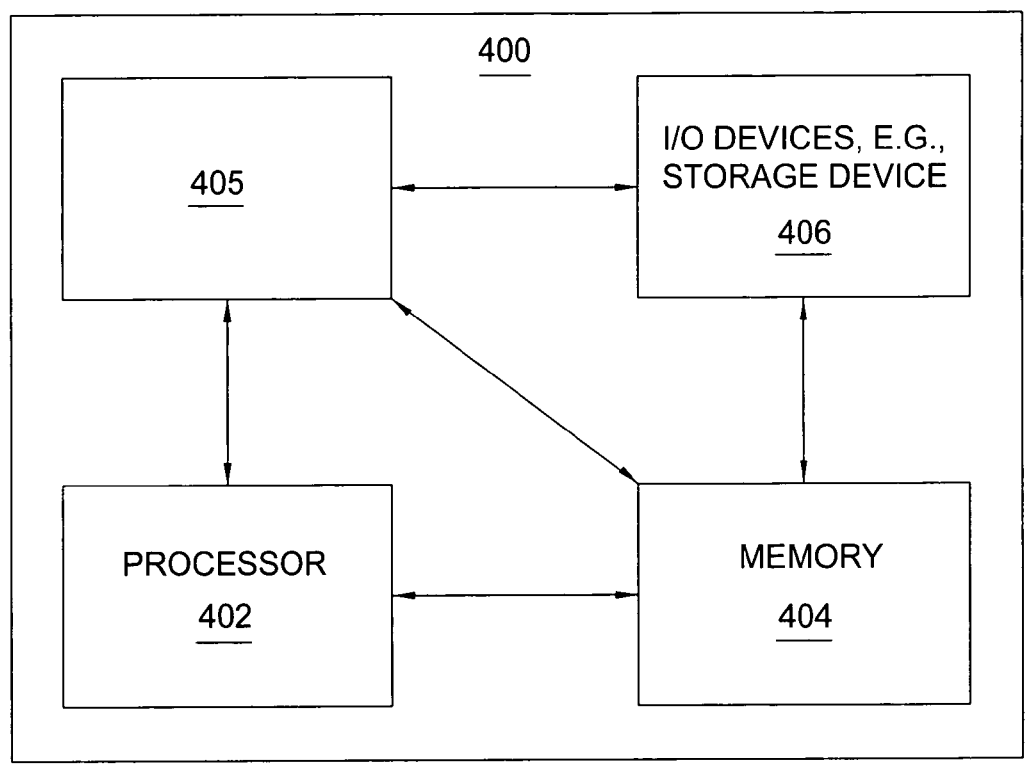
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for routing a call based on electronic calendar entries, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for routing a call based on electronic calendar entries can be loaded into memory 404 and executed by processor 402 to implement the functions as discussed above. As such, the present process 405 for routing a call based on electronic calendar entries (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for routing a call request in a communications network, comprising:

receiving, via a processor, the call request to establish a connection with a subscriber of a find me/follow me service, wherein the call request comprises a call setup message;

accessing, via the processor, an electronic calendar associated with the subscriber;

attempting, via the processor, to route the call request to a phone number associated with a present calendar entry detailed in the electronic calendar, wherein the attempting comprises attempting to determine the phone number in accordance with a phone number mapping data, wherein the phone number mapping data comprises designations of phone numbers to calendar entries, wherein each entry of the calendar entries comprises an activity, wherein the phone number mapping data is stored in a database, wherein the phone number mapping data is received from the subscriber via a web portal; and routing, via the processor, the call request in accordance with the find me/follow me service when the phone number is not determined in accordance with the phone number mapping data, wherein the communications network comprises a voice over internet protocol network.

2. The method of claim 1, wherein the electronic calendar is associated with an electronic calendar application that is capable of functioning as a stand-alone calendar application.

3. An apparatus for routing a call request in a communications network, comprising:

a processor; and a computer-readable medium storing a plurality of instructions which, when executed by the processor, cause the processor to perform operations, the operations comprising:

receiving the call request to establish a connection with a subscriber of a find me/follow me service, wherein the call request comprises a call setup message;

accessing an electronic calendar associated with the subscriber;

attempting to route the call request to a phone number associated with a present calendar entry detailed in the electronic calendar, wherein the attempting to route the call attempts to determine the phone number in accordance with a phone number mapping data, wherein the phone number mapping data comprises designations of phone numbers to calendar entries, wherein each entry of the calendar entries comprises an activity, wherein the phone number mapping data is stored in a database, wherein the phone number mapping data is received from the subscriber via a web portal; and routing the call request in accordance with the find me/follow me service when the phone number is not determined in accordance with the phone number mapping data, wherein the communications network comprises a voice over internet protocol network.

4. The apparatus of claim 3, wherein the electronic calendar is associated with an electronic calendar application that is capable of functioning as a stand-alone calendar application.

5. A non-transitory computer-readable medium storing a plurality of instructions which, when executed by a processor, causes the processor to perform operations for routing a call request in a communications network, the operations comprising:

receiving the call request to establish a connection with a subscriber of a find me/follow me service, wherein the call request comprises a call setup message;

accessing an electronic calendar associated with the subscriber;

attempting to route the call request to a phone number associated with a present calendar entry detailed in the electronic calendar, wherein the attempting comprises attempting to determine the phone number in accordance with a phone number mapping data, wherein the phone number mapping data comprises designations of phone numbers to calendar entries, wherein each entry of the calendar entries comprises an activity, wherein the phone number mapping data is stored in a database, wherein the phone number mapping data is received from the subscriber via a web portal; and routing the call request in accordance with the find me/follow me service when the phone number is not determined in accordance with the phone number mapping data, wherein the communications network comprises a voice over internet protocol network.

6. The non-transitory computer readable medium of claim 5, wherein the electronic calendar is associated with an electronic calendar application that is capable of functioning as a stand-alone calendar application.

\* \* \* \* \*